(12) United States Patent
Brunner et al.

(10) Patent No.: US 7,353,929 B2
(45) Date of Patent: Apr. 8, 2008

(54) CLUTCH LEVER ARRANGEMENT

(75) Inventors: Matthias Brunner, Schwebheim (DE); Joachim Lindner, Dittelbrunn (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 199 days.

(21) Appl. No.: 11/241,335

(22) Filed: Sep. 30, 2005

(65) Prior Publication Data

US 2006/0076211 A1 Apr. 13, 2006

(30) Foreign Application Priority Data

Oct. 2, 2004 (EP) .................................. 04023521

(51) Int. Cl.
*F16D 23/14* (2006.01)
(52) U.S. Cl. .................................... 192/99 S
(58) Field of Classification Search ............... 192/99 S
See application file for complete search history.

(56) References Cited

U.S. PATENT DOCUMENTS

| 1,712,943 | A | * | 5/1929 | Stranahan | ................. | 192/99 S |
| 4,529,077 | A | * | 7/1985 | Renaud | .................... | 192/99 S |
| 4,773,516 | A | * | 9/1988 | Parzefall | .................. | 192/30 V |
| 6,105,745 | A | | 8/2000 | Husse et al. | | |

FOREIGN PATENT DOCUMENTS

| DE | 29 35 079 | | 3/1981 |
| DE | 197 00 930 | | 9/1997 |
| EP | 94001 A2 | * | 11/1983 |
| GB | 1 240 463 | | 7/1971 |

* cited by examiner

*Primary Examiner*—Richard M Lorence
(74) *Attorney, Agent, or Firm*—Cohen Pontani Lieberman & Pavane LLP

(57) ABSTRACT

A clutch lever arrangement for a clutch, especially for a commercial motor vehicle clutch, having a clutch lever pivotably supported on a bearing point on a stationary component. The lever has a force-application section for introducing an actuating force by way of an actuating element and a force-transmission section for transmitting the actuating force to a clutch-release bearing, which is mounted with freedom to slide axially back and forth in the pivot plane of the clutch lever. To reduce undesirable vibrations of the clutch lever, the lever is guided in its pivot plane by a guide member.

8 Claims, 1 Drawing Sheet

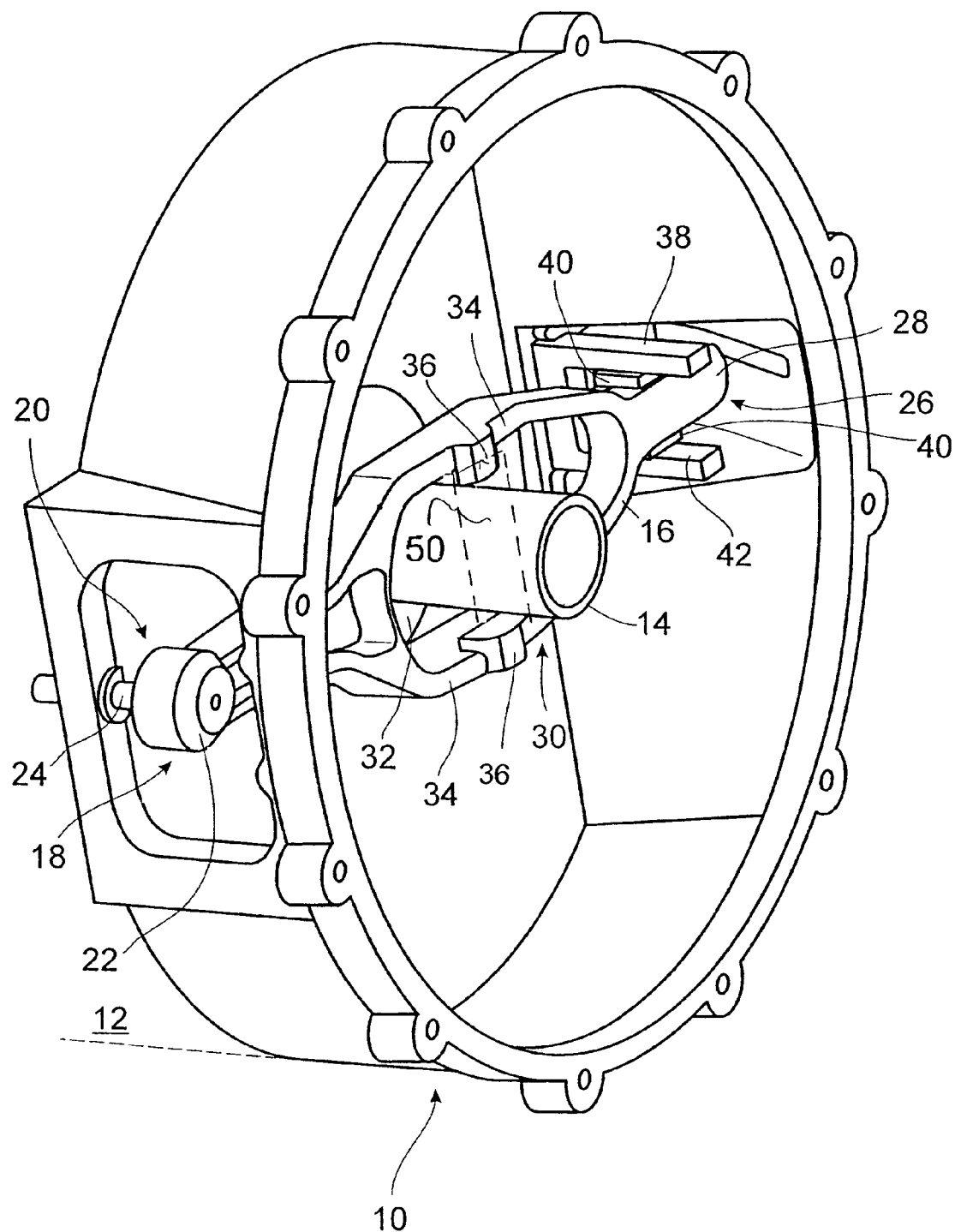

CLUTCH LEVER ARRANGEMENT

BACKGROUND OF THE INVENTION

1. Field of the Invention

The invention pertains to a clutch lever arrangement for a motor vehicle clutch.

2. Description of the Related Art

Clutch levers for transmitting an actuating force to a clutch-release bearing, usually located around a gearbox input shaft of a gearshift mechanism, in which the clutch-release bearing is in working connection with the releasing spring of a friction clutch, are generally known. An arrangement of this type can be derived from, for example, DE 197 00 930 A1, which corresponds to U.S. Pat. No. 6,105,745, in which a clutch lever, in the form of a rocker, is pivotably supported on a ball joint on a gearbox wall. An actuating force for actuating a friction clutch can be introduced to this lever at the other end. The clutch lever shown there has an opening in the center of its length, which surrounds a releasing device mounted on a guide tube. So that the clutch lever can transmit the releasing force, it is in contact with a ring-shaped flange of the release bearing.

In this arrangement, it has been found to be disadvantageous that, in spite of the spring provided to exert a pretensioning force on the release bearing, the clutch lever can execute oscillating movements primarily in the vertical plane but also in other planes while the internal combustion engine is running and/or while the vehicle is moving. During these oscillations, forces can be exerted both on the clutch-release bearing and on an actuating element, such as the plunger of a slave cylinder. If the clutch lever is supported in a position which does not coincide with the vertical axis of the vehicle (see FIG. 3 of DE 197 00 930 A1), furthermore, the releasing device is subjected to at least some of the force exerted by the weight of the lever. Overall, therefore, undesirable wear phenomena occur, which reduce the service life of the clutch system, and in the case of a hydraulic actuation system, this wear can also lead to noticeable deflections of the clutch pedal, which the driver perceives as a bothersome trembling of the foot and which thus interferes with the convenience of operating the clutch.

The invention, proceeding from the state of the art, therefore has the object of reducing the undesirable vibrations of the clutch lever in a motor vehicle.

SUMMARY OF THE INVENTION

This object is achieved by a clutch lever arrangement provided with guide means for guiding a clutch lever so that its movement is limited to within its pivoting plane. If the lever is vertically positioned, for example, it thus cannot execute any oscillating vibrations in a plane deviating from the vertical plane of the vehicle. As a result of this measure, the wear at the contact points between the clutch lever and the clutch release mechanism and the wear between the clutch lever and the actuating element are significantly reduced, which is reflected in a longer service life of the overall clutch system. With respect to the design of the guide means, one of ordinary skill in the art can take any one of numerous measures, such as the mounting of a guide rod or a guide fork on a component which is stationary with respect to the clutch lever, e.g., the housing of a gearshift mechanism or of the internal combustion engine provided to drive the vehicle.

So that the force can be transmitted effectively to the clutch-release bearing, it has been found advisable to locate the bearing point and the force-application point at the ends and the force-transmission section in the area of the center of the longitudinal dimension of the clutch lever.

The guide means are advantageously located in the area of the force-application section, as a result of which the introduction of undesirable forces to an actuating element can be prevented with particular reliability.

In an especially preferred embodiment of the invention, the guide means cooperate with the clutch lever to form a defined friction site to dampen vibrations. Thus, parasitic vibrations can be effectively prevented from acting on a hydraulic actuating system. This friction-damping site can also significantly improve the operating convenience of the vehicle's clutch and can be either an addition to, or a replacement of, a hydraulic damping element.

If the clutch lever is not positioned vertically but rather at an angle to the vertical axis of the vehicle, especially if it is positioned horizontally in the vehicle, vertical oscillations in particular can be reduced to a minimum, and at the same time the guide means will absorb up to half of the weight, as a result of which the pivot bearing point is relieved of load and can be made smaller in design.

For the transmission of the very high clutch-releasing forces which occur, for example, in commercial vehicles, the required strength of the clutch lever can be provided especially easily by manufacturing it in the form of a casting made of an iron or aluminum casting material.

Other objects and features of the present invention will become apparent from the following detailed description considered in conjunction with the accompanying drawings. It is to be understood, however, that the drawing is designed solely for purposes of illustration and not as a definition of the limits of the invention, for which reference should be made to the appended claims. It should be further understood that the drawing is not necessarily drawn to scale and that, unless otherwise indicated, it is merely intended to conceptually illustrate the structures and procedures described herein.

BRIEF DESCRIPTION OF THE DRAWINGS

The FIGURE shows an isometric view of a clutch lever arrangement of the present invention.

DETAILED DESCRIPTION OF THE PRESENTLY PREFERRED EMBODIMENTS

The FIGURE shows a bell 10, which is open toward a friction clutch, the details of which are not discussed here. The bell 10 is a component of a motor vehicle gearshift mechanism 12 with a guide tube 14, positioned approximately in the center, which surrounds a gearbox input shaft (not shown), which also represents at the same time the output shaft of the friction clutch. A clutch lever 16, made preferably in the form of a steel casting or forging, or deep-drawn from sheet metal, is positioned horizontally inside the gearbox bell 10. So that the clutch lever can be pivoted, a ball joint 20 with a ball socket 22 and a ball-ended spindle 24 is provided at one end 18 of the lever, where the ball-ended spindle is permanently screwed to the gearbox bell 10. At the other end 26, a force-application section 28, also socket-shaped, is provided for the introduction of an actuating force by an actuating element (not shown). The plunger of a slave cylinder of a hydraulic clutch-actuating device or a rod or spindle connected to a motorized actuator can be used, for example, as the actuating element. The positioning of the actuating element to one side turns out to be highly advantageous in terms of saving space.

In its center area 30, the clutch lever 16 has a slot 32, extending longitudinally along this area. Force-transmitting sections 36, projecting from the base body, are formed on the edges 34 of the slot. These sections serve to transmit the actuating force which has been introduced to the clutch lever 16 by the actuating element to a clutch-release bearing 50 (shown highly diagrammatically), which is mounted so that it is free to slide axially back and forth on the guide tube 14 in the pivot plane of the clutch lever 16, which for its own part is in working connection with the releasing spring of the friction clutch. In the area of the force-application section 28, the clutch lever 16 is guided in its pivot plane by a U-shaped guide means or member, which is oriented horizontally in the FIGURE, preferably in the form of a steel or aluminum element 38. For this purpose, the clutch lever 16 has sliding-contact segments 40 in this area, one on the upper side and one on the lower. These segments are made of a low-friction material such as bronze, brass, or plastic and are in contact with the inside surface 42 of the U-shaped element. The sliding-contact segments 40 are detachable, that is, they can be fastened by means of screws or rivets to the clutch lever 16 in such a way that they can be replaced after they have worn out. Alternatively, the clutch lever can be positioned on only one side by the guide means 38; for example, it can be suspended from the upper arm or allowed to rest on the lower arm. Or it could be guided by a guide rod or similar means. Alternatively, the sliding-contact segments 40 can also, of course, be realized on the guide means 38.

The tolerances are calculated so that the guide means 38 act as a slide bearing for the clutch lever and thus, in the horizontal arrangement shown here, distribute the weight of the clutch lever 16 equally between the ball joint and the lower section of the U-shaped element 38. The contact point with the guide means 38, however, is also optimized simultaneously so that it still allows a certain defined friction, which can be selected as a function of the actual application, and can thus effectively suppress undesirable vibrations of the clutch lever 16. The friction point between the clutch lever 16 and the guide means 38 is designed so that the actuating and restoring forces of the clutch are many times stronger than the frictional force acting there, that is, so that there is no perceptible negative action. The force-application section 28 of the clutch lever 16 can also, like its bearing point, be designed as a ball joint for engagement with a ball-ended spindle. The way in which the clutch lever 16 works and other aspects of its design are the same as those already known from the state of the art.

Thus, while there have shown and described and pointed out fundamental novel features of the invention as applied to a preferred embodiment thereof, it will be understood that various omissions and substitutions and changes in the form and details of the device illustrated, and in its operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A clutch lever arrangement for displacing a clutch release bearing of a clutch, comprising:
    a clutch lever pivotally mountable on a bearing point of a stationary component; and
    a guide means for guiding movement of the clutch lever in a pivot plane,
    wherein the clutch lever has:
    a force-application section configured for the application thereto of an actuating force to pivot the clutch lever in the pivot plane, and
    a force-transmitting section for transmitting the actuating force to the clutch release bearing, the clutch release bearing being mounted so as to be capable of sliding axially in the pivot plane,
    wherein the bearing point is located at a first end of the clutch lever, the force-application section is located at a second end of the clutch lever, and the force-transmitting section is located between the force-transmitting section and the bearing point, and
    wherein the guide means is positioned so as to cooperate with the force-application section.

2. The clutch lever arrangement of claim 1, wherein the guide means and the clutch lever are configured and oriented so as to dampen vibrational movement therebetween.

3. The clutch lever arrangement of claim 1, wherein the clutch lever is oriented so that, upon mounting of the clutch lever arrangement in a vehicle, a longitudinal axis of the clutch lever is at an angle relative to a vertical axis of the vehicle.

4. The clutch lever arrangement of claim 1, wherein the clutch lever is a casting.

5. A clutch lever arrangement for displacing a clutch release bearing of a clutch, comprising:
    a clutch lever pivotally mountable on a bearing point of a stationary component, the clutch lever having a first end and a second end opposite to the first end; and
    a guide member configured to guide the clutch lever to move in a pivot plane,
    wherein the clutch lever comprises a force-application section configured for the application thereto of an actuating force to pivot the clutch lever in the pivot plane, and a force-transmitting section for transmitting the actuating force to the clutch release bearing, the clutch release bearing being mounted so as to be capable of sliding in the pivot plane,
    wherein the bearing point is located at the first end of the clutch lever, the force-application section is located at the second end of the clutch lever, and the force-transmitting section is located between the force-transmitting section and the bearing point, and
    wherein the guide member is positioned so as to cooperate with the force-application section.

6. The clutch lever arrangement of claim 5, wherein the guide member and the clutch lever are configured and oriented so as to dampen vibrational movement therebetween.

7. The clutch lever arrangement of claim 5, wherein the clutch lever is oriented so that, upon mounting of the clutch lever arrangement in a vehicle, a longitudinal axis of the clutch lever is at an angle relative to a vertical axis of the vehicle.

8. The clutch lever arrangement of claim 5, wherein the clutch lever is a casting.

* * * * *